United States Patent
Finley et al.

(10) Patent No.: US 6,543,100 B1
(45) Date of Patent: Apr. 8, 2003

(54) TEST TUBE RETENTION SYSTEM

(76) Inventors: Christopher J. Finley, 11117 NW. 6th Ave., Vancouver, WA (US) 98685; Armida E. Nunez-Finley, 11117 NW. 6th Ave., Vancouver, WA (US) 98685

( * ) Notice: Subject to any disclaimer, the term of this patent is extended or adjusted under 35 U.S.C. 154(b) by 0 days.

(21) Appl. No.: 09/962,528

(22) Filed: Sep. 24, 2001

(51) Int. Cl.[7] ................................................... B01L 9/06
(52) U.S. Cl. .............................. 24/555; 24/339; 24/560
(58) Field of Search ........................ 24/336, 339, 545, 24/555, 531, 560; 422/99, 102, 104; 211/85.18; 220/23.83; 206/443, 446; 248/68.1, 74.2, 316.7

(56) References Cited

U.S. PATENT DOCUMENTS

| | | | | |
|---|---|---|---|---|
| 1,980,930 A | * | 11/1934 | Reyniers | 211/74 |
| 2,741,913 A | * | 4/1956 | Dovas | 68/205 R |
| 3,033,412 A | * | 5/1962 | Fox | 206/446 |
| 3,530,634 A | * | 9/1970 | Adams | 174/146 |
| 3,625,485 A | * | 12/1971 | Adler | 356/246 |
| 3,747,900 A | | 7/1973 | Dilts | 366/214 |
| 4,244,544 A | * | 1/1981 | Kornat | 248/68.1 |
| 4,585,119 A | | 4/1986 | Boyington | 206/209.1 |
| 4,982,850 A | | 1/1991 | Mears | 211/74 |
| D333,522 S | * | 2/1993 | Gianino | D24/229 |
| 5,191,975 A | * | 3/1993 | Pezzoli et al. | 206/151 |
| 5,403,554 A | * | 4/1995 | Freeman | 422/100 |
| 5,579,928 A | | 12/1996 | Anukwuem | 211/74 |
| 5,691,927 A | * | 11/1997 | Gump | 708/131 |
| 6,298,525 B1 | * | 10/2001 | Margo | 24/336 |

FOREIGN PATENT DOCUMENTS

EP 547657 A1 * 6/1993

* cited by examiner

Primary Examiner—James R. Brittain (57) ABSTRACT

A test tube retention system for facilitating an efficient and sterile lumbar puncture procedure. The test tube retention system includes a retainer structure having a first clip member, a second clip member, a third clip member and a fourth clip member connected to one another in a straight manner. Each clip member has a front opening formed for receiving and releasing a test tube. A plurality of upper cross members 50 and a plurality of lower cross members preferably extending between each of the clip members. A flange member preferably extends about the outer portion of the clip members for increasing the rigidity of the clip members with respect to one another. The flange member includes four front angled openings that correspond to each of the front openings within the clip members. The clip members preferably each have a tubular structure formed for snugly receiving the test tubes in a parallel manner to one another.

2 Claims, 7 Drawing Sheets

TEST TUBE RETENTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to medical test tubes and more specifically it relates to a test tube retention system for facilitating an efficient and sterile lumbar puncture procedure.

A "lumbar puncture" is an invasive diagnostic test, in which cerebrospinal fluid (CSF) is extracted for examination, and pressure of the spinal column is measured. The CSF is generally used to diagnose, or rule out such things as: primary or metastatic brain or spinal cord neoplasm, cerebral hemorrhage, meningitis, encephalitis, degenerative brain disease, autoimmune diseases of the central nervous system, demyelinating disorders (such as MS), neurosyphilis. The CSF that is withdrawn is evaluated for color, blood, cells, bacteria, malignant cells, glucose, protein, chloride, lactic dehydrogenase, lactic acid, and glutamine.

2. Description of the Prior Art

A conventional lumbar puncture procedure involves inserting a spinal needle into a patient's back thereby allowing CSF to pass through the needle into four test tubes in a specific order for proper testing. While a first test tube is being filled under the spinal needle, the physician grasps a second test tube with their free hand. Once the first test tube is filled, the first test tube is removed from underneath the spinal needle and the second test tube is then positioned beneath the spinal needle. The physician then caps and places the first test tube into a tray then grasps a third test tube. Once the second test tube is filled, the second test tube is removed from underneath the spinal needle and the third test tube is then positioned beneath the spinal needle. The physician then caps and places the second test tube into the tray then grasps a fourth test tube. Once the third test tube is filled, the third test tube is removed from underneath the spinal needle and the fourth test tube is then positioned beneath the spinal needle. The physician then caps and places the third test tube into the tray. Once the fourth test tube is filled, the fourth test tube is removed from underneath the spinal needle and then placed within the tray. The test tubes are then labeled and sent to their respective laboratories. For example, the first test tube and the third test tube typically are transferred to the hematology laboratory where cell counts are performed. The second test tube is typically transferred to the chemistries laboratory where glucose and protein are measured. The fourth test tube is typically transferred to a microbiology lab for gram stain and culture. The test tubes are typically placed within a plastic bag after the lumbar puncture procedure and then delivered to the lab. Another method of performing the lumbar puncture is for the physician to hand each test tube to an assistant who then caps and places the respective tube within the tray.

The main problem with conventional lumbar puncture tools and procedures is that they are relatively cumbersome requiring the physician to handle a plurality of test tubes while simultaneously retaining the spinal needle in place so as not to lose the position in the spinal canal. Patients that are unwilling or unable to cooperate with the physician simply increase the difficulty of the lumbar puncture procedure. Another problem is that conventional lumbar puncture procedures require the physician to handle each test tube individually which is relatively inefficient. A further problem with conventional lumbar puncture procedures is that there is an increased risk of spillage and contamination. Another problem is that the significant number of movements the physician must perform increases the likelihood that the spinal needle will move out of position thereby jeopardizing the completion of the procedure by risking contamination of a specimen with blood or causing undue discomfort to the patient. Another problem is that during transportation of the test tubes to the lab within the plastic bag, the test tubes may be inverted or horizontal thereby possibly leaking the CSF from within.

Examples of patented devices which are related to the present invention include U.S. Pat. No. 4,585,119 to Boyington; U.S. Pat. No. 5,579,928 to Anukwuem; U.S. Pat. No. 4,982,850 to Mears; U.S. Pat. No. 5,427,743 to Markin; U.S. Pat. No. 3,882,619 to Durand; U.S. Pat. No. 5,951,524 to Enriquez; U.S. Pat. No. 6,086,827 to Horner. However, none of these patents teach the structure and functionality of the present invention.

While these devices may be suitable for the particular purpose to which they address, they are not as suitable for facilitating an efficient and sterile lumbar puncture procedure. Conventional lumbar puncture procedures and devices do not promote efficient and sterile collection of cerebrospinal fluid (CSF) from a patient.

In these respects, the test tube retention system according to the present invention substantially departs from the conventional concepts and designs of the prior art, and in so doing provides an apparatus primarily developed for the purpose of facilitating an efficient and sterile lumbar puncture procedure.

SUMMARY OF THE INVENTION

In view of the foregoing disadvantages inherent in the known types of lumbar puncture tools and procedures now present in the prior art, the present invention provides a new test tube retention system construction wherein the same can be utilized for facilitating an efficient and sterile lumbar puncture procedure.

The general purpose of the present invention, which will be described subsequently in greater detail, is to provide a new test tube retention system that has many of the advantages of the lumbar puncture tools and procedures mentioned heretofore and many novel features that result in a new test tube retention system which is not anticipated, rendered obvious, suggested, or even implied by any of the prior art lumbar puncture tools and procedures, either alone or in any combination thereof.

To attain this, the present invention generally comprises a retainer structure having a first clip member, a second clip member, a third clip member and a fourth clip member connected to one another in a straight manner. Each clip member has a front opening formed for receiving and releasing a test tube. A plurality of upper cross members and a plurality of lower cross members preferably extending between each of the clip members. A flange member preferably extends about the outer portion of the clip members for increasing the rigidity of the clip members with respect to one another. The flange member includes four front angled openings that correspond to each of the front openings within the clip members. The clip members preferably each have a tubular structure formed for snugly receiving the test tubes in a parallel manner to one another.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a test tube retention system that will overcome the shortcomings of the prior art devices.

A second object is to provide a test tube retention system for facilitating an efficient and sterile lumbar puncture procedure.

Another object is to provide a test tube retention system that reduces the likelihood of spillage or contamination of a specimen.

An additional object is to provide a test tube retention system that decreases the awkwardness in performing the lumbar puncture procedure.

A further object is to provide a test tube retention system that decreases the total number of steps and overall time required to perform a lumbar puncture procedure.

Another object is to provide a test tube retention system that reduces the likelihood that the spinal needle will be accidentally moved from the desired position.

A further object is to provide a test tube retention system that receives various sizes of test tubes.

Another object is to provide a test tube retention system that retains the test tubes within a straight line and the same height thereby allowing the tubes to be placed within the appropriate tray receptacle sites.

A further object is to provide a test tube retention system that allows for the transportation of the test tubes without the test tubes becoming inverted or horizontal thereby reducing the likelihood of spillage of CSF.

Another object is to provide a test tube retention system that is able to withstand standard sterilization procedures.

An additional object is to provide a test tube retention system that allows a physician to fill four test tubes all at once during a lumbar puncture.

A further object is to provide a test tube retention system that allows for individual test tubes to be removed and inserted.

Another object is to provide a test tube retention system that allows the physician to grasp and retain all four test tubes simultaneously during the lumbar puncture procedure.

A further object is to provide a test tube retention system that reduces the need for physician-assistant interaction thereby reducing the risk of spillage of CSF or contamination thereof.

Another object is to provide a test tube retention system that may be incorporated within conventional lumbar puncture procedures without requiring additional training for personnel.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several views, FIGS. 1 through 7 illustrate a test tube retention system 10, which comprises a retainer structure 20 having a first clip member 30, a second clip member 30, a third clip member 30 and a fourth clip member 30 connected to one another in a straight manner. Each clip member 30 has a front opening 34 formed for receiving and releasing a test tube 12. A plurality of upper cross members 50 and a plurality of lower cross members 60 preferably extending between each of the clip members 30. A flange member 40 preferably extends about the outer portion of the clip members 30 for increasing the rigidity of the clip members 30 with respect to one another. The flange member 40 includes four front angled openings 42 that correspond to each of the front opening 34 within the clip members 30. The clip members 30 preferably each have a tubular structure formed for snugly receiving the test tubes 12 in a parallel manner to one another.

Figure 1:
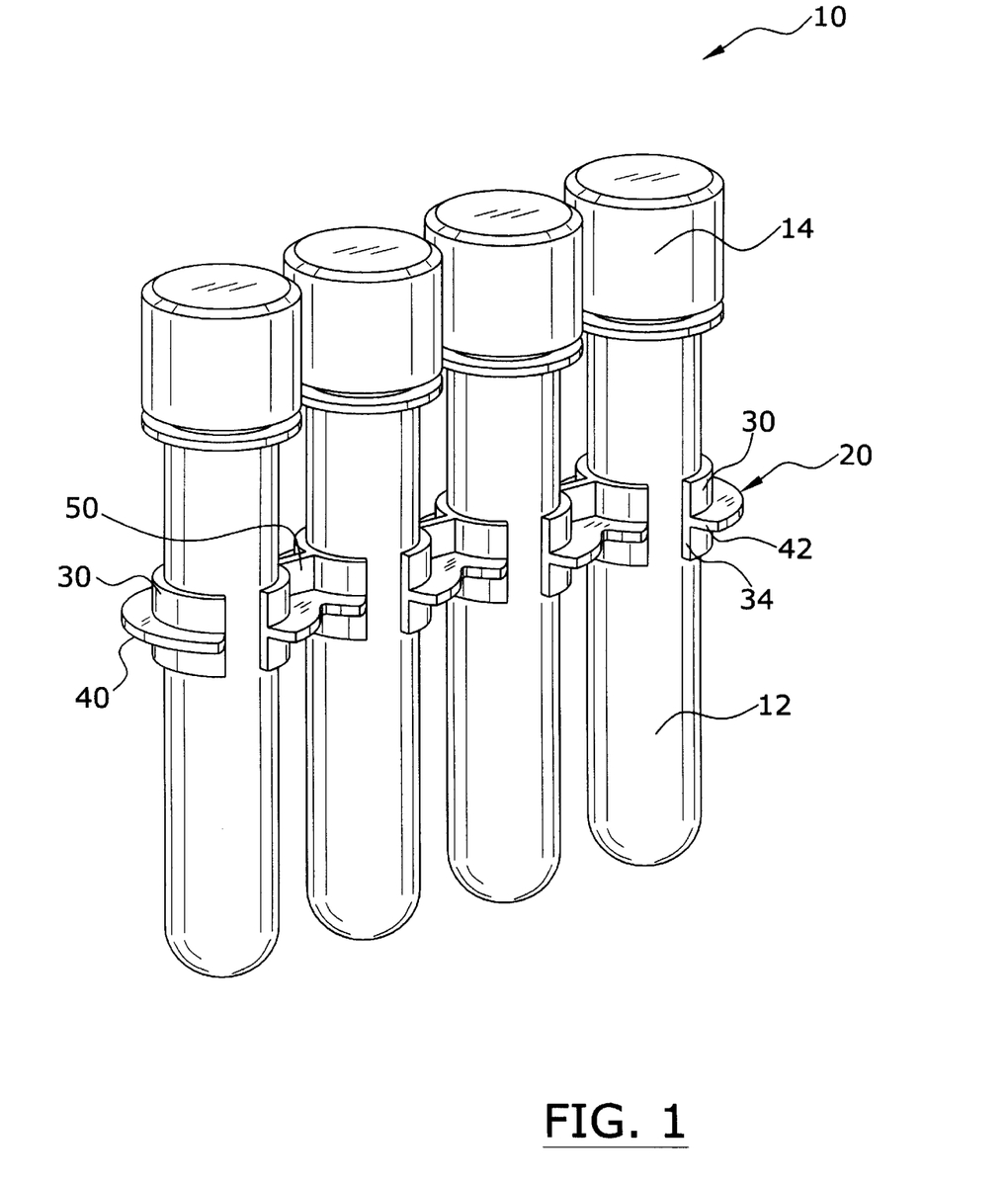
FIG. 1 is an upper perspective view of the present invention retaining four test tubes within.
Figure 2:
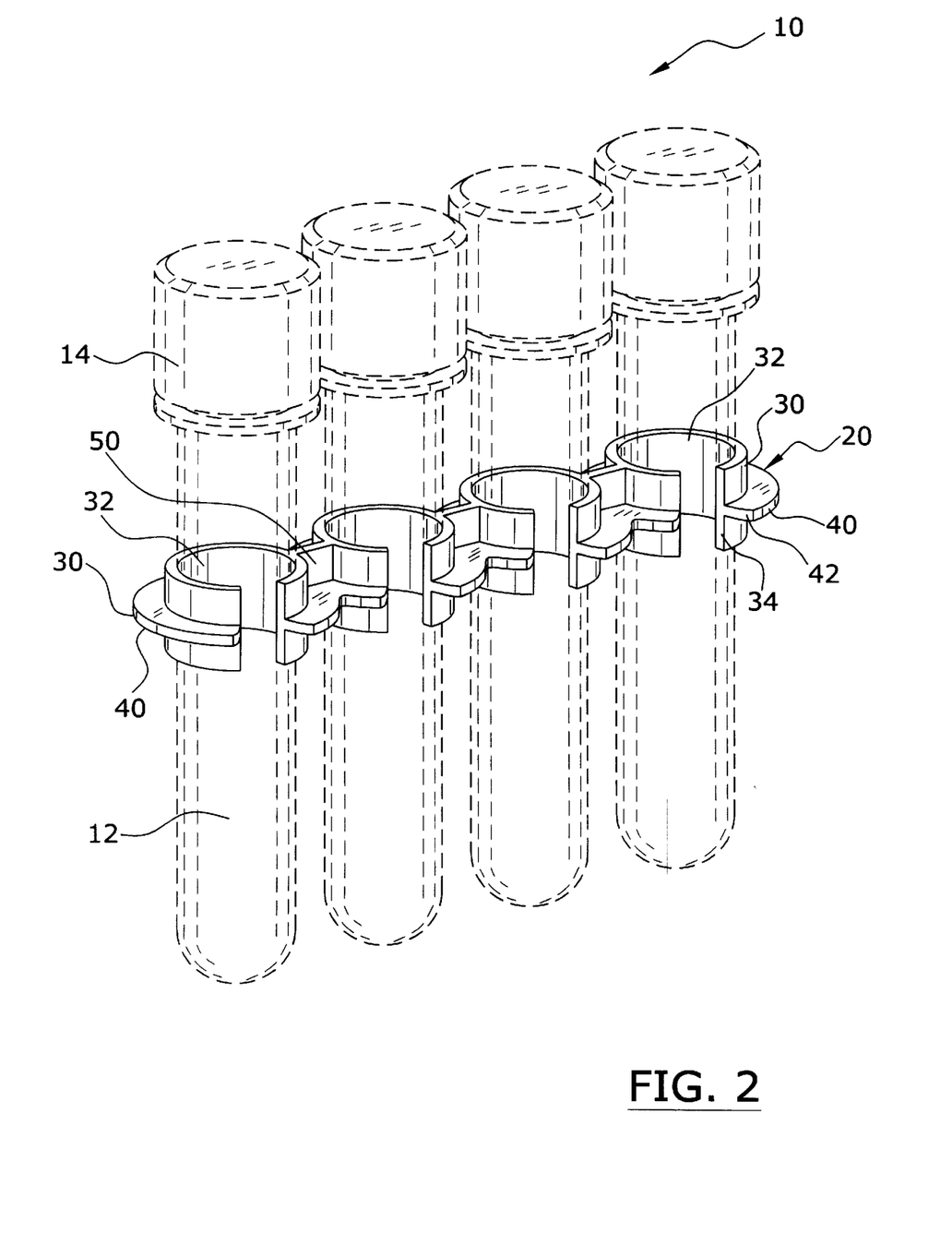
FIG. 2 is an upper perspective view of the present invention with the four test tubes in phantom lines.
Figure 3:
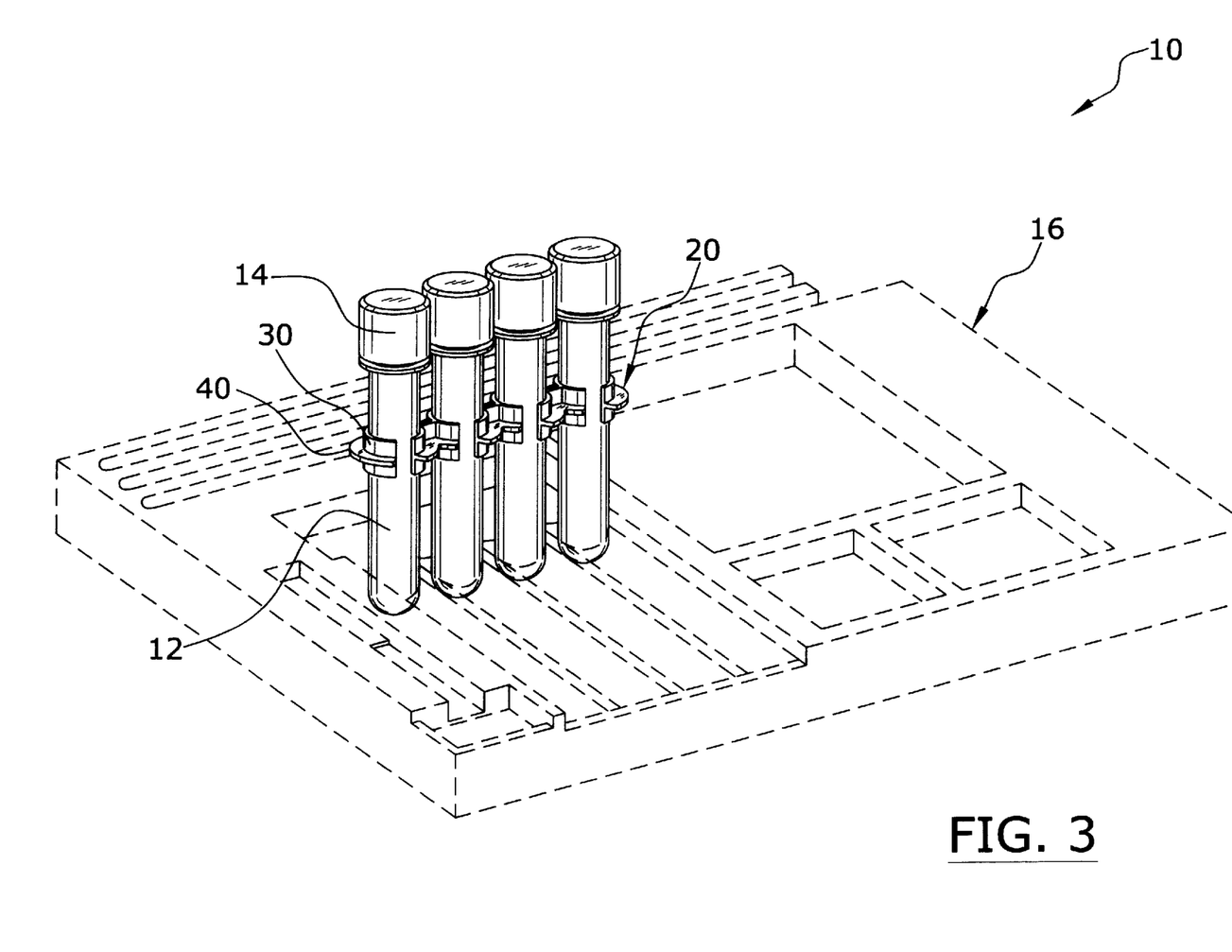
FIG. 3 is an upper perspective view of the present invention retaining four test tubes and positioned within a tray.
Figure 4:
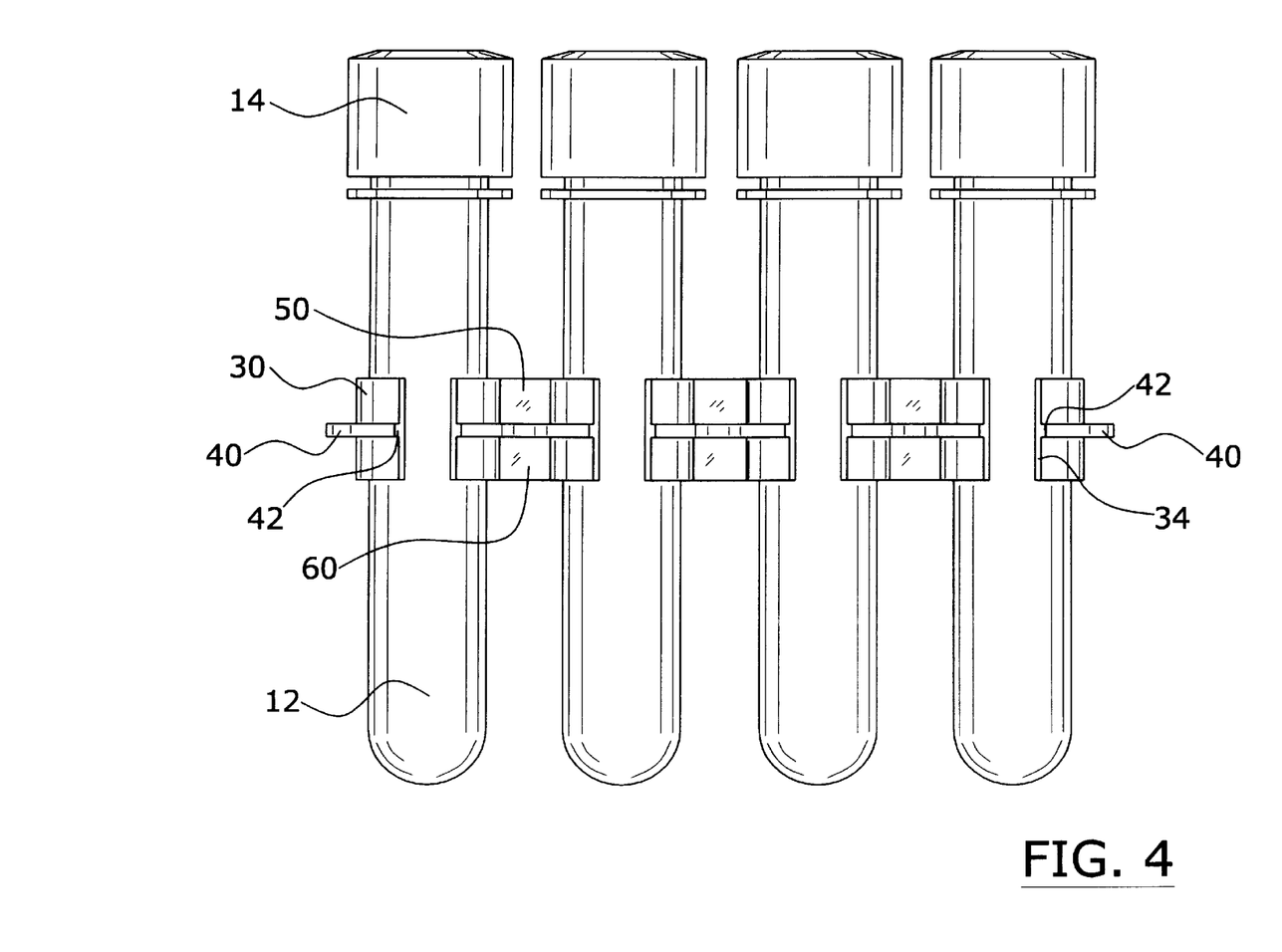
FIG. 4 is a front view of the present invention retaining four test tubes.
Figure 5:
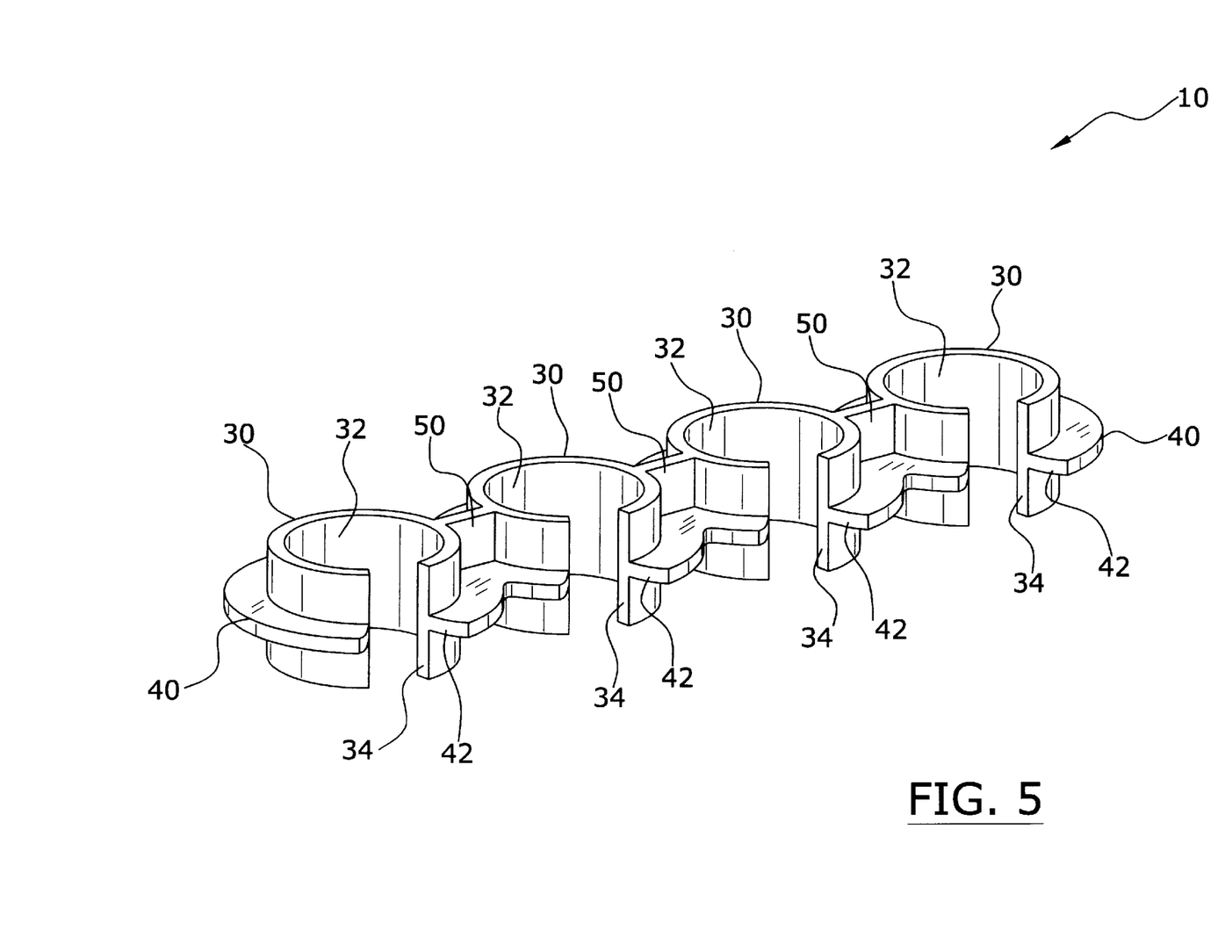
FIG. 5 is an upper perspective view of the present invention.
Figure 6:
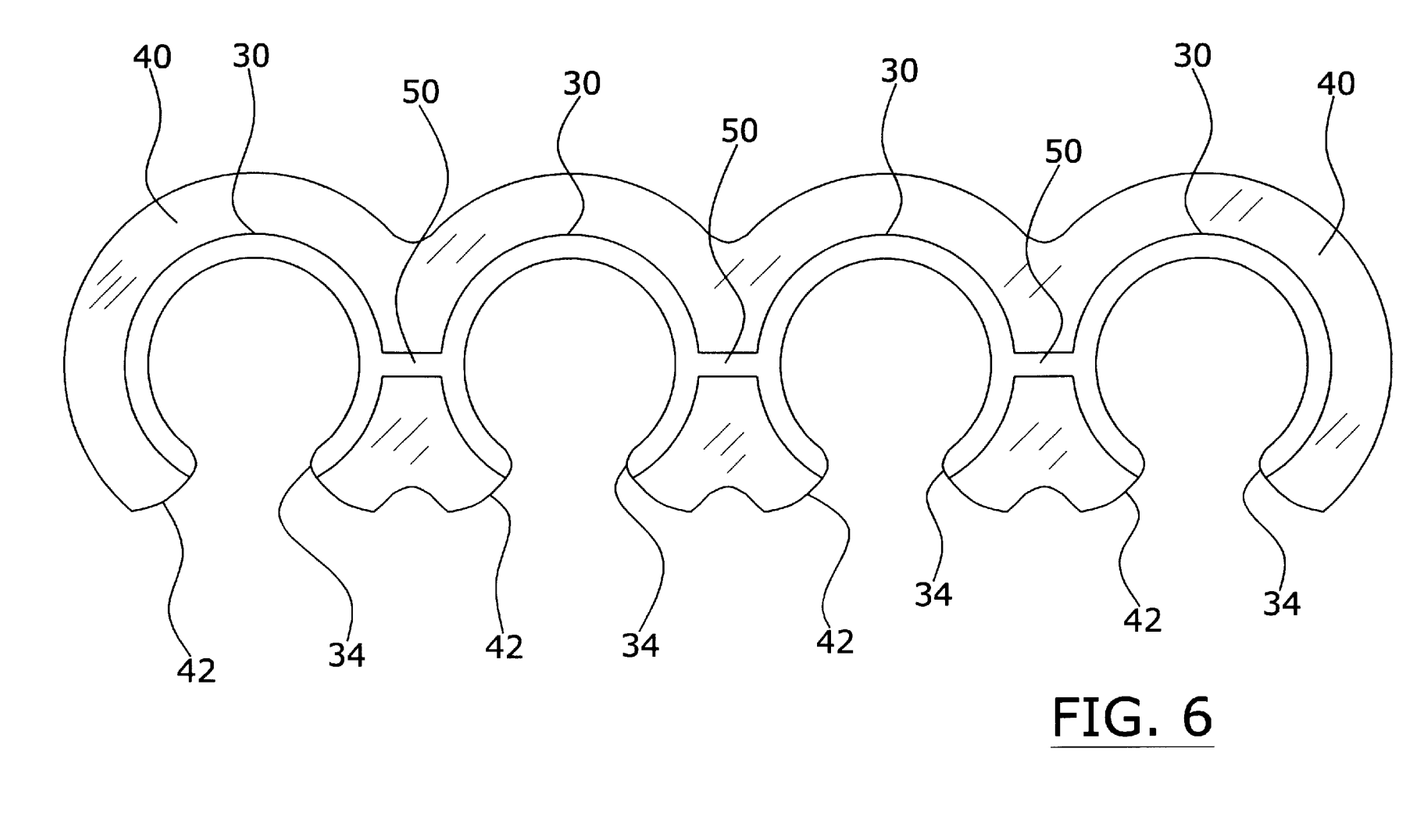
FIG. 6 is a top view of the present invention.
Figure 7:
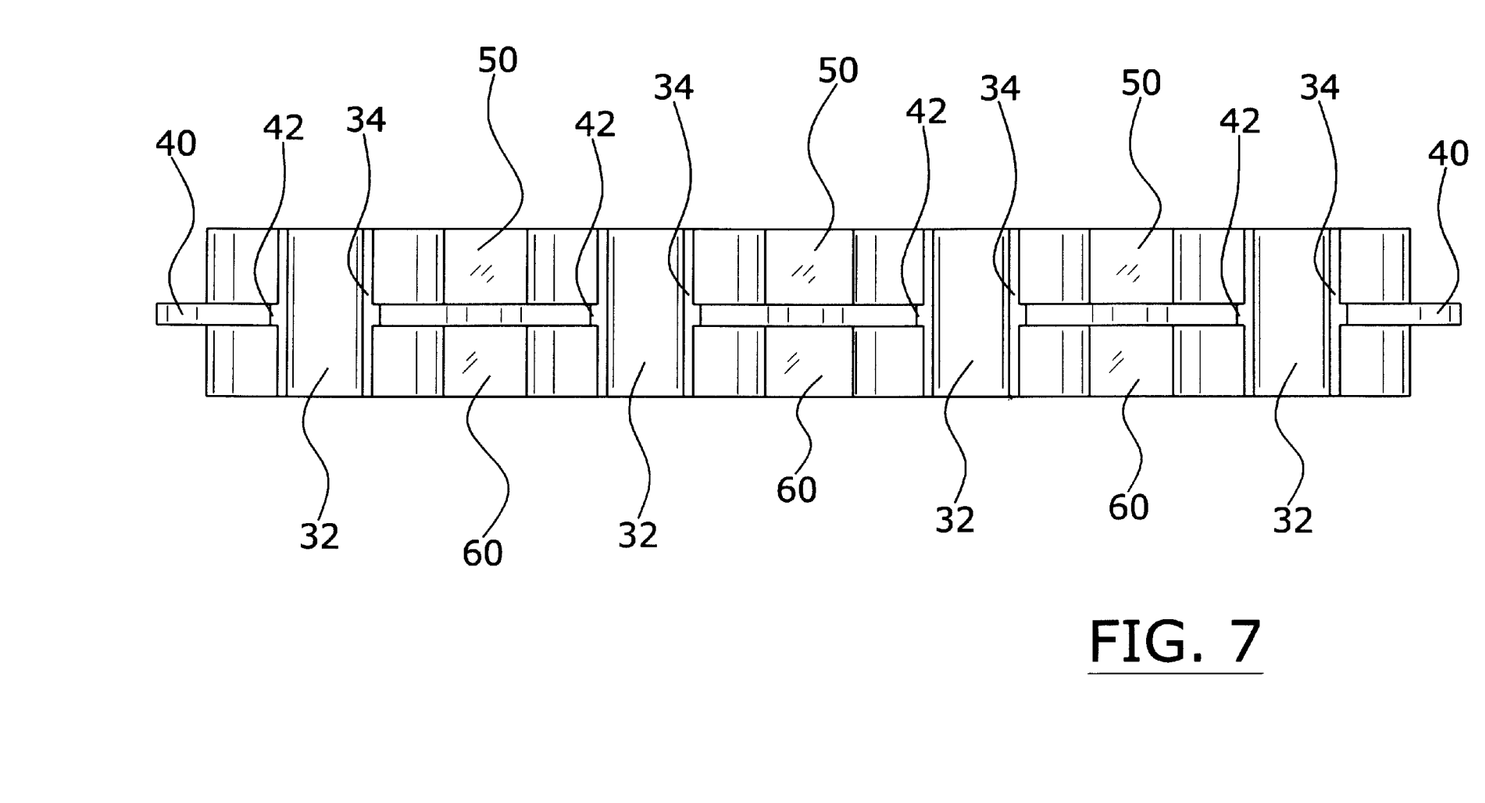
FIG. 7 is a front view of the present invention.

The retainer structure 20 is a generally straight structure having opposing ends as best shown in FIGS. 5 through 7 of the drawings. The retainer structure 20 is preferably comprised of a flexible and resilient material such as but not limited to plastic. The material utilized within the retainer structure 20 is preferably capable of withstanding standard sterilization procedures. The retainer structure 20 may be manufactured utilizing various types of manufacturing processes such as but not limited to injection molding.

As best shown in FIG. 5 of the drawings, the retainer structure 20 includes four clip members 30 that are formed for removably receiving a corresponding number of test tubes 12. Each of the clip members 30 are formed into a tubular structure capable of snugly receiving a test tube 12. The clip members 30 have an outer surface and an inner surface 32 wherein the inner surface 32 engages the outer portion of the test tube 12. The clip member 30 preferably have a circular cross sectional area, however various other cross sectional shapes may be utilized to snugly receive the test tube 12. Each of the clip member 30 members are aligned in a straight manner so as to align the test tubes 12 within in a straight and parallel manner as shown in FIGS. 1 through 4 of the drawings.

As shown in FIGS. 1, 2, 4, 5, 6 and 7 of the drawings, each of the clip members 30 include a front opening 34 for receiving and releasing a respective test tube 12 from within. The front opening 34 is formed for allowing easy removal and insertion of a test tube 12 from within without undue force having to be applied by an individual while snugly retaining a test tube 12 within the clip member 30.

As shown in FIGS. 1 through 7 of the drawings, a flange member 40 surrounds all of the clip members 30 in a manner traverse to a central axis within each of the clip members 30. The flange member 40 provides increased support to the retainer structure 20 during manipulation by the user. The flange member 40 further increases the inward forces applied to a test tube 12 within a clip member 30. The flange member 40 includes four front angled openings 42 in conjunction with each of the four front opening 34 as best illustrated in FIGS. 5 and 6 of the drawings. The front angled openings 42 taper outwardly from each front opening 34 for allowing easy insertion of the test tube 12 into the clip member 30.

As shown in FIG. 7 of the drawings, three upper cross members 50 and three lower cross members 60 extend between each of the four clip members 30 in a vertical manner which is traverse to the flange member 40. The cross members 50, 60 preferably are connected to the flange member 40 as best shown in FIG. 7 of the drawings. The cross members 50, 60 are preferably aligned within a straight line that passes through a center point within each of the clip members 30 as best shown in FIG. 6 of the drawings.

It can be appreciated that the retainer structure 20 may be packaged in a sterile container with or without a tray 16. In addition, sterilized test tubes 12 may also be included within the packaging with the retainer structure 20. It can be appreciated that the present invention may be packaged in various manners which are not discussed.

In use, the physician positions a test tube 12 within each of the clip members 30. More specifically, each test tube 12 is positioned within the front angled opening 42 of the flange member 40 and then forced inwardly toward the front opening 34 of the respective clip member 30 thereby expanding the front angled opening 42 and the front opening 34. The test tube 12 is further inserted into snugly received within the respective clip member 30. This process continues until all four test tubes 12 are properly positioned within the retainer structure 20 as illustrated within FIGS. 1 through 4 of the drawings. The physician then removes all of the caps 14 from the test tubes 12 and then places the test tubes 12 within a tray 16 or other sterile location. The physician then places the spinal needle within the patient's back in the proper location which allows the CSF to escape from the spinal canal. The physician then grasps the retainer structure 20 with the four test tubes 12 and then sequentially fills each tube with the dispersed CSF. After the test tubes 12 are properly filled, the retainer structure 20 and test tubes 12 may then be either handed over to an assistant or directly positioned by the physician within the tray 16. The caps 14 are then secured to each of the test tubes 12 to prevent contamination of the CSF within. Each of the test tubes 12 are then properly labeled to identify the order that each of the test tubes 12 was filled in. The retainer structure 20 and the test tubes 12 containing the CSF are then transferred to a first lab (i.e. chemistry, microbiology, or hematology) wherein the appropriate test tube 12 is removed from the respective clip member 30 for analysis. The remaining test tubes 12 within the retainer structure 20 are then sent to the second lab wherein the same process is repeated with the removal of the desired test tube 12 and then transferring the remaining test tubes 12 to the next lab until all of the test tubes 12 are removed from the retainer structure 20 for testing. When all of the test tubes 12 are removed from the retainer structure 20, the retainer structure 20 may then be disposed of in a proper manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A test tube retainer for retaining a plurality of test tubes utilized within a lumbar puncture procedure, comprising:

a plurality of clip members secured to one another, wherein said plurality of clip members are formed for snugly receiving said plurality of test tubes, wherein each of said plurality of clip members has a front opening for inserting and removing a corresponding test tube, wherein said plurality of clip members each have a center axis that are parallel to one another, wherein said plurality of clip members are aligned along a common plane, wherein a straight axis passes through said center axis of each of said plurality of clip members, wherein said plurality of clip members have a circular cross sectional shape, wherein said front opening is tapered outwardly, wherein said plurality of clip members are formed for aligning said plurality of test tubes parallel to one another, wherein each of said plurality of clip members are equidistantly spaced apart;

a flange member extending about an exterior portion of said plurality of clip members in a manner traverse to said center axis, wherein said flange member includes a plurality of front angled openings that correspond to each of said plurality of front openings within said clip members; and a plurality of upper cross members and a plurality of lower cross members secured between each of said plurality of clip members and traverse to said flange member.

2. A test tube retainer for retaining four test tubes utilized within a lumbar puncture procedure, comprising:

four clip members secured to one another, wherein said four clip members are formed for snugly receiving said four test tubes, wherein each of said four clip members has a front opening for inserting and removing a corresponding test tube, wherein said four clip members each have a center axis that are parallel to one another, wherein said four clip members are aligned along a common plane, wherein a straight axis passes through said center axis of each of said four clip members, wherein said four clip members have a circular cross sectional shape, wherein said front opening is tapered outwardly, wherein said four clip members are formed for aligning said four test tubes parallel to one another, wherein each of said four clip members are equidistantly spaced apart;

a flange member extending about an exterior portion of said plurality of clip members in a manner traverse to said center axis, wherein said flange member includes four front angled openings that correspond to each of said four front openings within said clip members; and three upper cross members and three lower cross members secured between each of said four clip members and traverse to said flange member.

* * * * *